H. MIELKE.
Grain-Separator.
No. 168,659.
Fig. 1.
Patented Oct. 11, 1875.
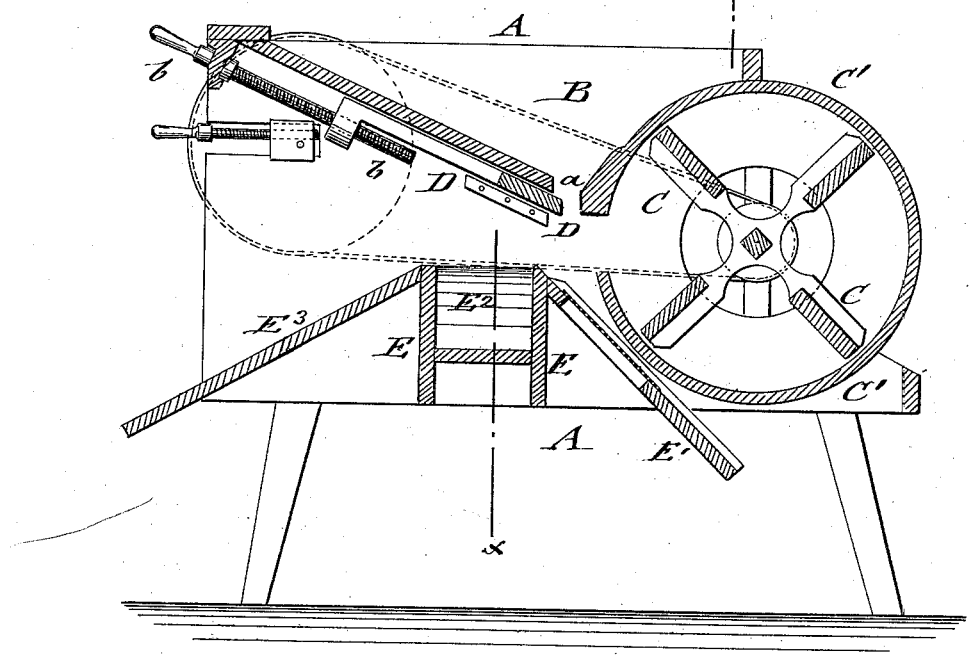
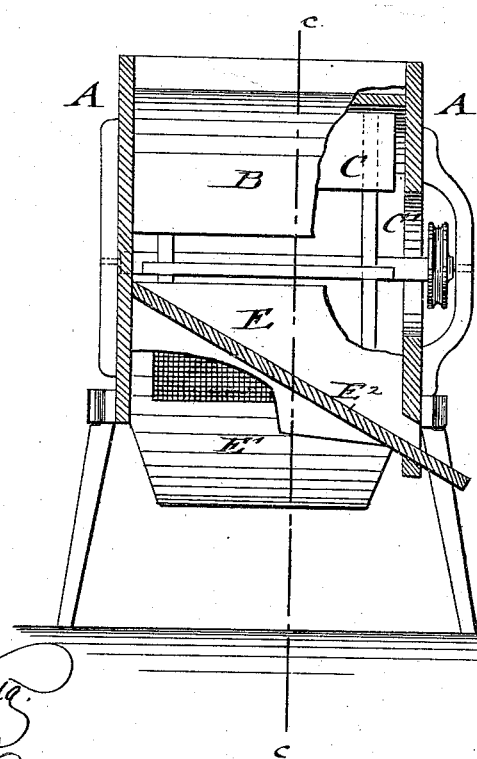
Fig. 2.
WITNESSES:
INVENTOR:
H. Mielke
BY
ATTORNEYS.

UNITED STATES PATENT OFFICE.

HERMANN MIELKE, OF WATERTOWN, WISCONSIN.

IMPROVEMENT IN GRAIN-SEPARATORS.

Specification forming part of Letters Patent No. 168,659, dated October 11, 1875; application filed May 22, 1875.

*To all whom it may concern:*

Be it known that I, HERMANN MIELKE, of Watertown, Jefferson county, Wisconsin, have invented a new and Improved Fanning-Mill, of which the following is a specification:

Figure 1 represents a vertical longitudinal section of my improved fanning-mill on the line $cc$, Fig. 2; and Fig. 2, a vertical transverse section of the same on the line $xx$, Fig. 1.

Similar letters of reference indicate corresponding parts.

The invention will first be described in connection with drawing, and then pointed out in the claim.

In the drawing, A represents the frame of my improved fanning-mill, which is provided with a hopper, B, at the top part, and a fan, C, revolving in a fan-casing, C', at one end of the frame A. The upper part of the fan-casing forms one side of the grain-conveying hopper, and is made with increasing thickness toward the lateral issuing-opening $a$ of the hopper, so as to form an inclined or curved plane, to discharge the grain or seed to be cleaned to the required point below. The hopper-opening $a$ is made larger or smaller, or closed entirely, by means of an adjustable slide-piece, D, that is guided on the under side of the hopper part opposite the fan-casing, and set by a regulating crank-screw, $b$. In front of the fan-casing, and below the opening of the hopper, are arranged the lateral partition-walls E, of which the one nearest the fan-casing is slightly in front of the hopper-opening, so that the heavy grain is dropped between the partition and hopper, and conveyed, by an inclined plane, $E^1$, below the fan-casing to a suitable receptacle. The current created by the fan acts on the grain in its passage from the hopper, and separates the light grain from the heavier. The lighter falls on a laterally-inclined plane, $E^2$, between the partitions E, and is conveyed to the side of the mill, the chaff and other impurities being conveyed over an outer inclined plane, $E^3$, extending downward from the second partition-wall.

The fan is rotated at greater or less speed, and the regulating-slide adjusted according to the kind and quality of grain or other seed passing through the mill to be cleaned, and separated thereby in very effective manner.

The incline for the heavy grain below the fan may be provided with a wire sieve, if desired, to clean the same on its passage of any adhering sand or other heavier impurities, which would not be thrown by the air-current over the partition-walls. Thus a simple and readily-operated grain cleaner and separator is furnished, that can be advantageously worked for any kind of grain by regulating the feed-current and feed-opening to correspond to the same.

Having thus described my invention, I claim as new and desire to secure by Letters Patent—

The combination, with hopper and fan, of the slide D, partition-walls E, and inclined planes $E^1$ $E^2$ $E^3$, as and for the purpose specified.

HERMANN MIELKE.

Witnesses:
   T. I. HEIDEMANN,
   FRANZ NOWARK.